United States Patent
Gilchrist et al.

(10) Patent No.: US 7,166,834 B2
(45) Date of Patent: Jan. 23, 2007

(54) METHOD AND APPARATUS FOR DETERMINING THE THERMAL NEUTRON CAPTURE CROSS-SECTION OF A SUBSURFACE FORMATION FROM A BOREHOLE

(75) Inventors: W. Allen Gilchrist, Houston, TX (US); Randolph J. Walser, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 311 days.

(21) Appl. No.: 10/730,552

(22) Filed: Dec. 8, 2003

(65) Prior Publication Data

US 2005/0121606 A1    Jun. 9, 2005

(51) Int. Cl.
*G01V 5/10* (2006.01)
(52) U.S. Cl. .................. 250/269.1; 250/269.6
(58) Field of Classification Search .......... 376/160; 250/269.1, 269.6
See application file for complete search history.

(56) References Cited

U.S. PATENT DOCUMENTS

| 4,327,290 A | 4/1982 | Plasek ............... 250/262 |
| 4,424,444 A * | 1/1984 | Smith et al. ............. 250/269.7 |
| 4,645,926 A * | 2/1987 | Randall ................. 250/256 |
| 4,656,354 A | 4/1987 | Randall ................. 250/256 |
| 4,668,863 A | 5/1987 | Gray et al. ............. 250/256 |
| 4,712,007 A | 12/1987 | Ondrik ................. 250/270 |
| 2003/0138067 A1* | 7/2003 | Tiller et al. ............ 376/160 |

OTHER PUBLICATIONS

Russel R. Randall et al.; *Time Derived Sigma for Pulsed Neutron Capture Logging*, SPE 9614, Middle East Oil Technical Conference of the Society of Petroleum Engineers, Manama, Bahrain, Mar. 9-12, 1981, pp. 345-347, 4 Figs.

W.A. Gilchrist, Jr.; *Introduction of a New Through-Tubing Multifunction Pulsed Neutron Instrument*, SPE 56803, 1999 SPE Annual Technical Conference and Exhibition, Houston, Texas Oct. 3-6, 1999, pp. 1-11, 19 Figs.

\* cited by examiner

*Primary Examiner*—David Porta
*Assistant Examiner*—Djura Malevic
(74) *Attorney, Agent, or Firm*—Madan, Mossman & Sriram, P.C.

(57) ABSTRACT

Data acquired using a pulsed nuclear source are susceptible to two sources of error. One error is due to large statistical noise towards the end of an acquisition window. Another source of error is the contamination of the early portion of the data by borehole and other effects. The beginning of the processing window is adjusted based on the signal level at the end of the processing window for the preceding pulsing of the source. The end of the processing window is derived from statistical considerations.

25 Claims, 4 Drawing Sheets

METHOD AND APPARATUS FOR DETERMINING THE THERMAL NEUTRON CAPTURE CROSS-SECTION OF A SUBSURFACE FORMATION FROM A BOREHOLE

BACKGROUND OF THE INVENTION

1. Field of the Invention

The present invention is related to the field of oil well logging. More specifically, it relates to improved techniques for data acquisition in induced gamma ray logging methods.

2. Description of the Related Art

Well logging systems have been utilized in hydrocarbon exploration for many years. Such systems provide data for use by geologists and petroleum engineers in making many determinations pertinent to hydrocarbon exploration. In particular, these systems provide data for subsurface structural mapping, defining the lithology of subsurface formations, identifying hydrocarbon-productive zones and interpreting reservoir characteristics and contents. Many types of well logging systems exist which measure different formation parameters such as conductivity, travel time of acoustic waves within the formation and the like.

One class of well logging systems seeks to measure the incidence of nuclear particles on the well logging tool from the formation for analysis purposes well known in the art. These systems take various forms, including those measuring natural gamma rays from the formation. Still other systems measure gamma rays from the formation induced by bursts of neutrons entering the formation from a neutron source carried by the tool and pulsed at a preselected interval.

Additionally, it is frequently useful to obtain data regarding the time spectral distributions of the occurrence of the gamma rays. Such data can yield extremely valuable information about the formation, such as identification of lithologies which are potentially hydrocarbon-producing. Moreover, this desired spectral data may not only be limited to that of natural gamma rays, but also may be desired for the gamma ray spectra caused by bombardment of the formation with the aforementioned pulsed neutron sources.

Well logging systems for measuring neutron absorption in a formation use a pulsed neutron source providing bursts of very fast, high-energy neutrons. Pulsing the neutron source permits the measurement of the macroscopic thermal neutron absorption capture cross-section $\Sigma$ of a formation. The capture cross-section of a reservoir rock is indicative of the porosity, formation water salinity and the quantity and type of hydrocarbons contained in the pore spaces. In wireline well logging operations, as the neutron source is pulsed and the measurements made, the instrument is continuously pulled up through the borehole. This movement makes it possible to evaluate formation characteristics over a range of depths.

The measurement of neutron population decay rate is made cyclically. The neutron source is pulsed for 40–60 microseconds to create a neutron population. Neutrons leaving the pulsed source interact with the surrounding environment and are slowed. In downhole environment, collisions between the neutrons and the surrounding fluid and formation atoms slow the neutrons. Such collisions may impart sufficient energy to these atoms to leave them in an excited state, from which gamma rays are emitted after a short time as the atoms return to a stable state. Such emitted gamma rays are called inelastic gamma rays. As the neutrons are slowed to the thermal state, they may be captured by atoms in the surrounding matter. Atoms capturing such neutrons are also elevated to an excited state, and emit gamma rays after a short time as the atoms return to a stable state. Gamma rays emitted due to this neutron capture reaction are called capture gamma rays.

Several prior art references are aimed at improving measurements in capture cross-section logging. For example, a method and apparatus employing a source and two detectors are discussed in U.S. Pat. Nos. 4,645,926 and 4,656,354, both issued to Randall. A subsurface instrument includes a long-spaced (LS) and short-spaced (SS) detector for detecting natural or induced gamma ray emissions from subsurface formations. The detectors produce electrical pulses, each pulse corresponding in time with the incidence of a corresponding gamma ray on the detector and having an analog voltage amplitude correlative of the gamma ray. A method is discussed in Randall '354 for determining presence of a gas by comparing first and second parameters obtained at the detectors. The first parameter is indicative of a count of detected impingements of primarily inelastic gamma radiation upon a detector. The second parameter is indicative of a count of detected impingements of primarily capture gamma radiation upon a detector. Randall '926 discusses a method of determining a parameter of the borehole, where primarily inelastic gamma radiation is normalized upon impingement on a detection device.

The number of capture gamma rays present at any time is in direct proportion to the number of thermal neutrons, i.e., the thermal neutron population. The decay rate of this neutron population is an exponential function and may be defined by specifying the time required for the thermal neutron population to decrease to one-half ("the 'half-life time'"). Although the neutron lifetime may be measured, a more useful parameter is the capture cross-section. Capture cross-section and neutron lifetime are inversely related, the capture cross-section being a measure of the rate at which thermal neutrons are captured in the formation. Analysis of a formation using the capture cross-section or the half-life time is referred to as "neutron decay analysis."

The well logging instrument measures the capture gamma rays to determine the thermal neutron decay time or "neutron lifetime." The neutron lifetime represents combined effects of the thermal neutron capture cross-section in each of several volumes of space surrounding the logging instrument ("regions"). These regions generally include the instrument itself, the fluid in the wellbore, the steel casing, the cement, the earth formations radially proximal to the wellbore wall (which may have been infiltrated by fluid from within the wellbore), and the earth formations radially more distal from the wellbore wall (which have minimal infiltration from the fluid in the wellbore).

In U.S. Pat. No. 4,668,863, issued to Gray, et. al., an apparatus is used to analyze and process parameters including the macroscopic thermal neutron absorption capture cross-section of the formation at borehole elevations corresponding to the locations from which spectra are derived. For acquiring temporal spectral data, a multi-channel scale section is provided which includes a channel number generator which produces a numerical sequence of memory address codes corresponding to a sequence of adjacent time windows. Each code uniquely defines a start time. The windows collectively comprise the time interval of the desired spectrum. Each time a gamma ray pulse is detected, the tool addresses a memory location corresponding to the detection time and increments the count value resident therein. At the conclusion of the time spectrum interval of interest, the memory locations may be interrogated by the CPU and the resultant spectral data analyzed, transmitted to the surface or presented visually as a gamma ray emission count versus time plot. Correlation is made of detection signals in response to impingement of gamma radiation upon first and second detectors.

A method employed by Randall et. al. in "Time-Derived Sigma for Pulsed Neutron Capture Logging" SPE 9614, p. 345, 1981, determines the timing of the measure interval using on a two-pass $\Sigma$ measurement. That is, two $\Sigma$ computations are continuously derived. A first-pass $\Sigma$ value is measured over the fixed-time interval from 400 μsec to 1000 μsec after each neutron burst. Simultaneously, a second-pass $\Sigma$ measurement is made over a single gate of 600 μsec gate width which starts at a selectable time between 200 μsec and 400 μsec after the burst. The positioning of the second-pass gate is dependent upon the first-pass $\Sigma$ value. Although positioning an acquisition window can remove the effect of noisy data points from subsequent calculation, significant noise can still be introduced.

There is a need for a technique of adjusting an acquisition window size to improve the quality of data used in gamma ray calculations. The present invention fulfills this need.

SUMMARY OF THE INVENTION

The present invention is a method and apparatus for determining a parameter of interest of an earth formation with a logging tool having a pulsed source used to irradiate the earth formation. A detector spaced apart from the source the results of interaction of said irradiating with said earth formation. The received signals are analyzed using a processor that defines a starting time for analysis at a time at which non-formation effects are small and an ending time for analysis at a time at which the signals are statistically significant.

In one embodiment of the invention, the source is a pulsed neutron source and a cross-section of the formation is determined. The starting time for analysis is based in part on signal levels towards the end of the analysis window corresponding to an earlier pulsing of the source. The ending time for analysis may be determined by comparing the signal level with a running average of the signals.

DESCRIPTION OF PREFERRED EMBODIMENT

Figure 1:
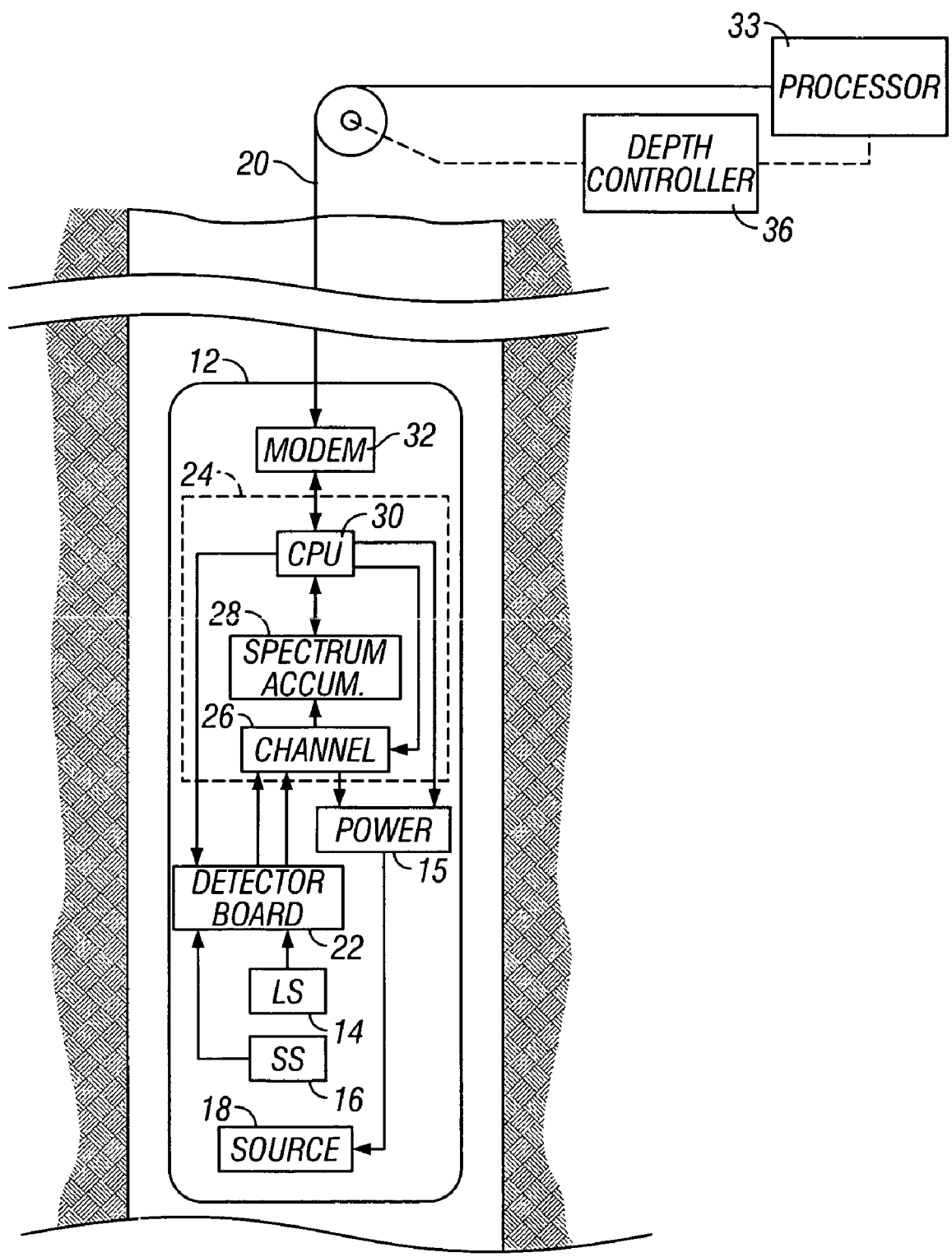
FIG. 1 (prior art) shows a schematic of an induced gamma ray well logging instrument suitable for use with the present invention.

Referring now to FIG. 1, there is illustrated a nuclear well logging apparatus suitable for use with one embodiment of the present invention. This particular configuration is an example of prior art that could be used and is not intended to be a limitation, and there are other arrangements that could be used. For example, many of the functions that are described herein as being done by electronic circuitry could also be performed by a suitable microprocessor.

Well 10, also called a borehole, penetrates the earth's surface and may or may not be cased depending upon the particular well being investigated. Disposed within well 10 is subsurface well logging instrument 12. The system diagramed in FIG. 1 is a microprocessor-based nuclear well logging system using multi-channel scale analysis for determining the timing distributions of the detected gamma rays. Well logging instrument 12 includes long-spaced (LS) detector 14, short-spaced (SS) detector 16 and pulsed neutron source 18. In one embodiment of the invention, LS and SS detectors 14 and 16 are comprised of bismuth-germanate (BGO) crystals coupled to photomultiplier tubes. In another embodiment of the invention, the detectors are made of sodium iodide (NaI). Other suitable materials for detectors include Gadolinium Orthosilicate. To protect the detector systems from the high temperatures encountered in boreholes, the detector system may be mounted in a Dewar-type flask. Source 18 comprises a pulsed neutron source using a D–T reaction where deuterium ions are accelerated into a tritium target, thereby generating neutrons having an energy of approximately 14 MeV. Power is supplied to the neutron source 18 through power supply 15. Cable 20 suspends instrument 12 in well 10 and comprises conductors for electrically connecting instrument 12 with the surface apparatus discussed below. Instead of an electrical connection, a fiber optic connection may be used for connecting the instrument 12 to the surface apparatus.

The outputs from LS and SS detectors 14 and 16 are coupled to detector board 22 which amplifies these outputs and compares them to an adjustable discriminator level for passage to channel generator 26. Channel generator 26 is a component of multi-channel scale (MCS) section 24 which further includes spectrum accumulator 28 and downhole processor 30. MCS section 24 accumulates spectral data in spectrum accumulator 28 using a channel number generated by channel generator 26 and. After all of the channels have had their data accumulated, CPU 30 reads the spectrum, or collection of data from all of the channels, and sends the data to modem 32 which is coupled to cable 20 for transmission of the data over a communication link to the surface apparatus. Channel generator 26 generates synchronization signals which control the pulse frequency of source 18. The downhole processor 30 further communicates control commands which define certain operational parameters of instrument 12, including the discriminator levels of detector board 22, and the filament current and accelerator voltage supplied to source 18 by power supply 15.

The surface apparatus includes may include a processor 33 coupled to cable 20 for recovery of data from instrument 12 and for transmitting command signals to instrument 12. The surface apparatus also includes a depth controller 36 which provides signals to the processor 33 indicating the movement of instrument 12 within well 10. A display unit, plotter, and mass storage unit (not shown) may also be associated with the processor 34. The primary purpose of display unit and plotter is to provide visual indications of the generated logging data as well as systems operations data. Storage unit is provided for storing logging data generated by the system as well as for retrieval of stored data and system operation programs. The surface equipment may also include a transceiver (not shown) for a satellite link enabling transmission of data to and receiving instructions from a remote location.

In a well logging system such as is illustrated by FIG. 1, processor 33 initially transmits system operation programs and command signals to be implemented by downhole processor 30, such programs and signals relating to the particular well logging operation. Instrument 12 is then caused to traverse well 10 in a conventional manner, with source 18 being pulsed in response to synchronization signals from channel generator 26. Typically, source 18 is pulsed at a rate of 1000 bursts/second (1 KHz). This, in turn, causes a burst of high energy neutrons on the order of 14 MeV to be introduced into the surrounding formation to be investigated. In a manner previously described, this population of high energy neutrons introduced into the formation will cause the generation of gamma rays within the formation which at various times will impinge on LS and SS detectors 14 and 16. As each gamma ray thus impinges upon the crystal-photomultiplier tube arrangement of the detectors, a voltage pulse having an amplitude functionally related to the energy of the particular gamma ray is delivered to detector board 22. Dynamic temperature compensation is provided and a digital signal is passed to channel generator 26 of MCS section 24.

Figure 2:
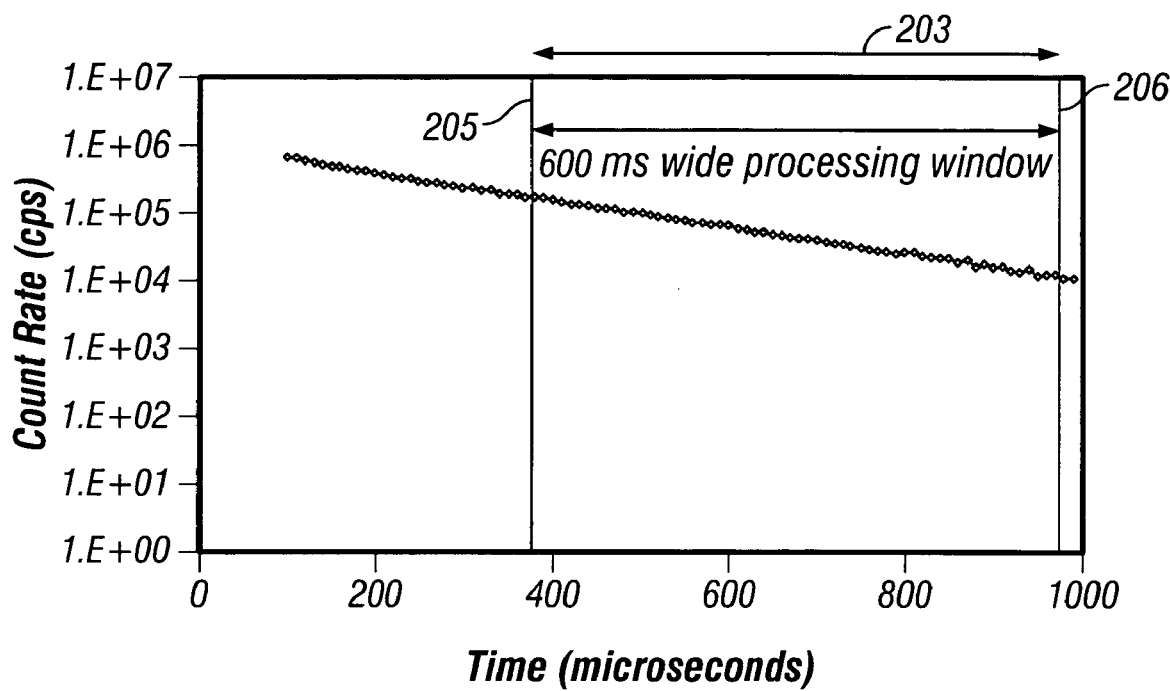
FIG. 2 shows pulsed neutron decay data substantially free from noise.

FIG. 2 shows typical pulsed neutron decay data for a formation sigma of 20 c.u. and a borehole sigma of 100 c.u. Time is displayed in microseconds along the abscissa, and the count rate is displayed logarithmically in counts/second (cps) along the ordinate. Data are shown over a time interval of 0–1000 μs following a pulsing of the source. From this data, a narrower processing window 203 is defined having a start time 206 of approximately 370 μs and an end time of approximately 970 μs. The data located within the processing window of FIG. 2 is substantially free from noise. Therefore, adjusting the acquisition window to improve accuracy is unnecessary in this case. These data can be reasonably processed with a full 600-μsec wide processing window as indicated. As is the usual practice in the field of nuclear logging, the ordinate has a logarithmic scale.

Figure 3:
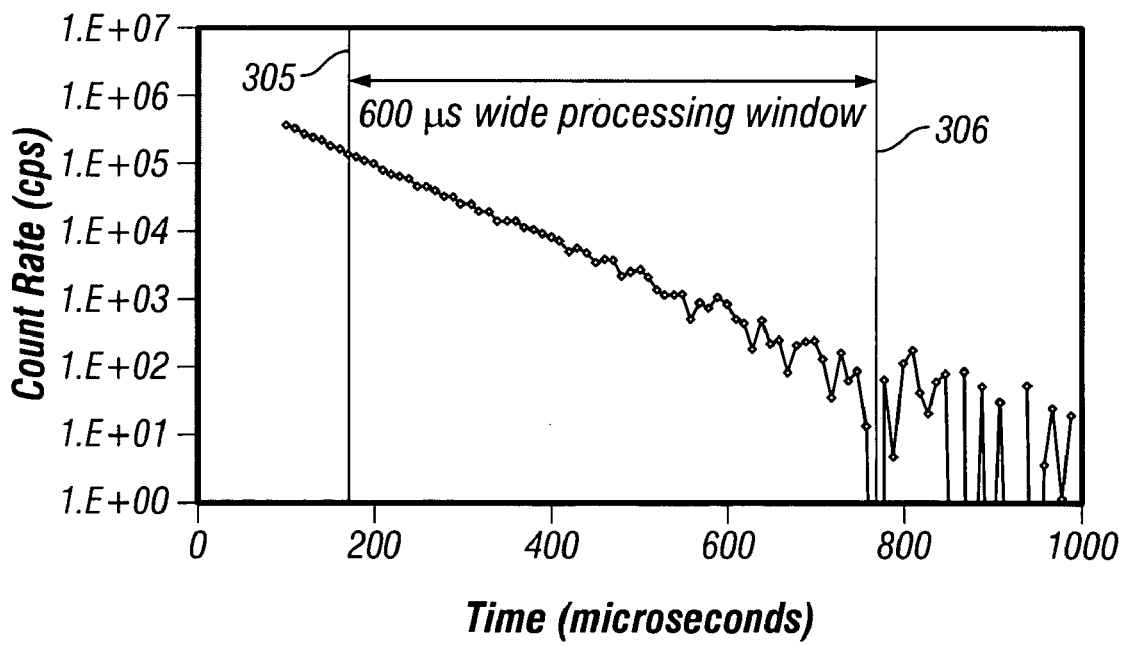
FIG. 3 shows noisy pulsed neutron decay data with an adjusted acquisition window.

FIG. 3 shows typical pulsed neutron decay data obtained from a wellbore comprising a formation having a Σ of 55 c.u. and a borehole having a Σ of 100 c.u. If the data of FIG. 3 are processed using a full 600-μsec wide acquisition window beginning and ending at the times such as that indicated in FIG. 2, noisy data would be included, thereby reducing the accuracy of later calculations. Prior art methods that use a fixed processing window length would correct for the noise at the end of the acquisition by simply starting the processing window at an earlier time, such as 305 and end the processing window at 306 and keeping a fixed processing window length of 600 μs. Such prior art methods for positioning that acquisition window are discussed, for example, in Randall et al. "Time Derived Sigma for Pulsed Neutron Capture Logging", SPE 9614, 1981. By acquiring data earlier in the cycle, some noisy data found late in the cycle can be disregarded. Thus, by having an earlier start time for the processing window, the noisy data acquired during the time period from 800 μsec to 1000 μsec is not. Some noisy data is still obtained in the approximate time period of 700 μsec to 800 μsec. Moving the start of the processing window to still earlier times while avoiding late, noisy data, would lead to another problem. Data acquired at earlier times (before approximately 170 μs) is typically affected by nuclei from the borehole as these nuclei have a faster decay rate. Therefore, moving a processing window to earlier times in order to avoid noisy data late in the cycle can lead to processing undesired data from the borehole that is not indicative of formation properties.

Figure 4:
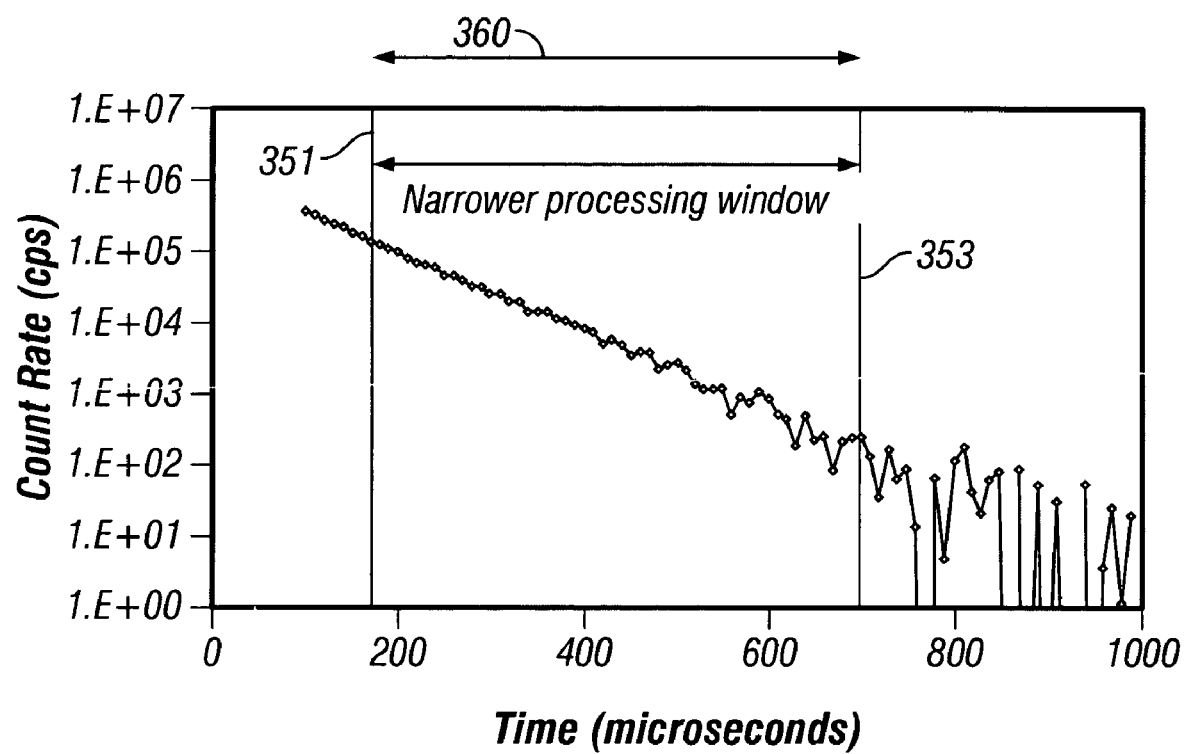
FIG. 4 shows noisy pulsed neutron decay data with an acquisition window of varying duration.

FIG. 4 shows the same data of FIG. 3 processed using a variable processing window width using the method of the present invention. As in FIG. 3, the processing window starts at an earlier time, ~170 μsec (405). The end of the processing window occurs at ~700 μsec (406). Thus, the duration of the processing window of FIG. 4 is reduced (530 μsec) over the window of FIG. 3. As a result, the noisy data in the region of 700 μsec to 800 μsec is removed from further calculations, thereby enabling improved accuracy, while, at the same time, avoiding undesirable signals from the borehole. Furthermore, the reduced processing window size of the present invention enables an operator to avoid undesired data points at both early and late times.

The present invention combines previous methods with a statistical test to determine when the signal has dropped into the noise as described above and then narrows the processing window so that only meaningful data are used in the determination of the apparent formation Σ. For nuclear logging, the entire acquisition (and processing) window is described in terms of channels that correspond to short time windows within the acquisition window. A typical decay rate can be determined using the following equation:

$$t = \frac{\sum_{i=istr}^{iend} tch[i] * cnt[i]}{\sum_{i=istr}^{iend} tch[i]^2 * cnt[i]} \quad (1)$$

where t is the decay rate, istr and iend are the start and end channels used for the data acquisition, tch[i] is the time in the middle of the i-th channel i, cnt[i] is the number of counts recorded in the $i^{th}$ channel. In the present invention, the start channel (or the beginning of the processing window) for data acquired for the second and subsequent pulsing of the source is determined by using a sliding gate formula An earlier previous pulsing of the source (referred to as a sweep) gives rise to a late gate Σ value from the last channels of the sweep. In the current sweep, this late gate sigma value of the previous sweep is used to determine the time of the start of the processing window, using Eq. (2):

$$istr = \frac{2 * 4545.4545}{late\_gate\_sigma}. \quad (2)$$

In order to determine the time at which the end channel of this processing window occurs, an exponential running average is calculated and tracked. The exponential running average is an initialized sum average (sumavg=0.0). As each consecutive channel is accessed, the average is modified in the appropriate manner. A typical modification scheme of the present invention is shown in Eq. (3):

$$sumavg=0.8*sumavg+0.2*counts[i] \quad (3)$$

Figure 5:
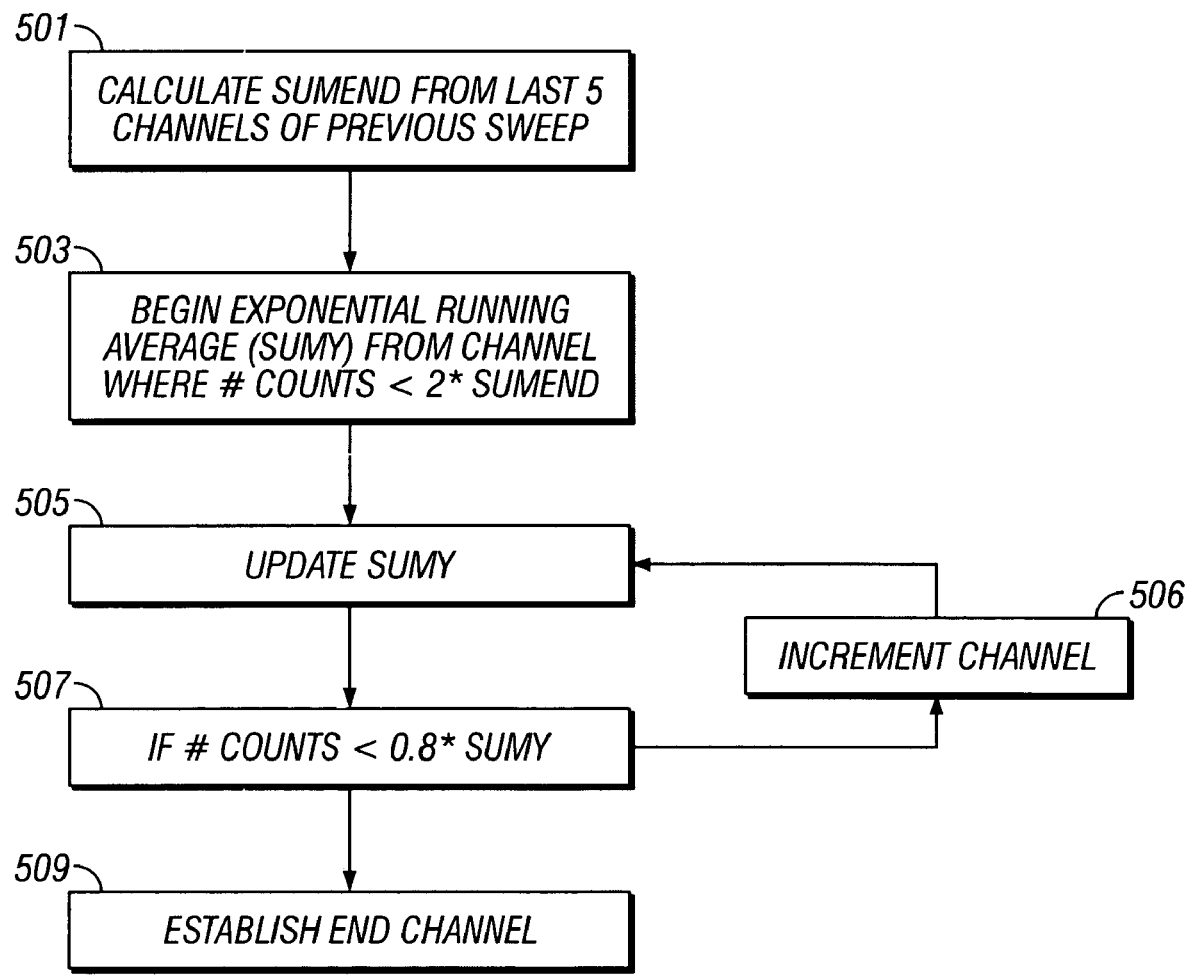
FIG. 5 shows a flowchart of a method of the present invention.

FIG. 5 shows a flowchart of a method of the present invention. An exponential average, sumend, of the last five channels of the previous sweep is computed in Box 501 and is used to determine a starting point for tracking the exponential running average of the current cycle. It is important to define the starting time for analysis so that the signals are not affected by non-formation contributions, such as from the borehole. An exponential average of the counts[i] is maintained beginning at the channel where the number of counts in the channel falls below twice sumend (counts[i] <2.0*sumend). This is shown in Box 503. The factor of two used in this step has been found to give the best results, though other factors could also be used. This average is referred to herein as sumy. Sumy represents the exponential running average from the present channel i (determined using counts[i]<2.0*sumend) to channel i+4. Sumy is updated as each consecutive channel is accumulated (Box 505). Once a channel is accessed in which the number of counts in the current channel registers below 0.8 of the current sumy (counts[i]<0.8*sumy), as in Box 507, the spectrum is assumed to have fallen below a threshold at which the background noise masks any useful information. If the counts remains above this value the next channel is recorded (Box 506), and sumy is updated (Box 505). Otherwise the current channel becomes the end channel (Box 509).

The processing window length is calculated from the algorithm of Eq. (4):

$$i\text{width} = i - istr$$
$$\text{if } (i\text{width} < 30), i\text{width} = (i\text{width} + 30)/2 \quad (4)$$
$$\text{if } (i\text{width} < 20), i\text{width} = 20$$

The calculated length (iwidth) is then compared with the length from the previous scan (prev_width). If iwidth>prev_width, iwidth=0.75*prev_width+0.25*iwidth. Each calculation of iwidth is rounded up to the next integer.

Upon completion of data acquisition, the decay rate can be computed from Eq. (1). This decay rate t obtained is used to calculate the apparent formation $\Sigma$ using Eq. (5):

$$\Sigma = \frac{a_1 + a_2 t + a_3 t^2 + a_4 t^3}{t} \quad (5)$$

where $a_1$, $a_2$, $a_3$, and $a_4$ are functions of the channel width. The cross section is a parameter of interest that can be determined using the method of the present invention. invention.

The invention has been described above with reference to an apparatus conveyed on a wireline. The method is equally useful when conveyed on coiled tubing for use in substantially horizontal boreholes, or on drilling tubulars (including drillstrings and coiled tubing) in a Measurement while Drilling (MWD) implementation.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A method for estimating a parameter of interest of an earth formation with a tool having a nuclear radiation source and a nuclear radiation detector spaced apart from the nuclear radiation source, the method comprising:
   (a) activating the nuclear radiation source;
   (b) defining a starting time for a processing time window using a relationship of the form:

$istr = K/\Sigma$ where istr is the start time of a window, K is a constant, and $\Sigma$ is a capture cross section at the ending time of the processing time window for the earlier operation of the source
   (c) processing the measurements for determining an ending time for the processing time window at which the measurements are substantially uncontaminated by noise; and
   (d) analyzing the measurements within the processing time window for estimating the parameter of interest.

2. The method of claim 1 wherein the nuclear radiation source comprises a pulsed neutron source.

3. The method of claim 2 wherein the parameter of interest comprises at least one of (i) a thermal neutron capture cross section of the earth formation, (ii) porosity, (iii)formation water salinity, and, (iv) the quantity and type of hydrocarbons contained in pore spaces.

4. The method of claim 1 wherein the measurements made by the nuclear radiation detector comprise gamma ray measurements.

5. The method of claim 1 wherein determining the ending time of the processing window further comprises forming a running sum of count rates starting at the starting time and determining a time at which a count rate has a predetermined relation to the running sum.

6. An apparatus for use within a borehole penetrating an earth formation for estimating a parameter of interest of said earth formation, comprising:
   (a) a nuclear radiation source configured to irradiate the earth formation;
   (b) a nuclear radiation detector spaced apart from said nuclear radiation source;
   (c) a processor configured to:
      (i) defined a starting time for a processing time window using a relationship of the form:

$istr = K/\Sigma$ where istr is the start time of a window, K is a constant, and $\Sigma$ is a capture cross section at the ending time of the processing time window for the earlier operation of the source; and
      (ii) process the measurements to determine an ending time for the processing time window at which the measurements made by the nuclear radiation detector are substantially uncontaminated by noise.

7. The apparatus of claim 6, wherein the nuclear radiation source further comprises a pulsed neutron source.

8. The apparatus of claim 7, wherein the measurements made by the nuclear radiation detector comprise gamma ray measurements.

9. The apparatus of claim 7, wherein the parameter of interest determined by the processor further comprises at least one of (i) a thermal neutron capture cross section of the earth formation, (ii) porosity, (iii)formation water salinity, and, (iv) the quantity and type of hydrocarbons contained in pore spaces.

10. The apparatus of claim 6 wherein the processor determines the ending time based on forming a running sum of count rates starting at the starting time and determining a time at which a count rate has a predetermined relation to the running sum.

11. The apparatus of claim 6 further comprising a conveyance device which conveys the tool into a borehole in the earth formation, the conveyance device selected from the group consisting of (i) a wireline, and (ii) coiled tubing.

12. The apparatus of claim 11 wherein the conveyance device is one of (i) a wireline, (ii) coiled tubing.

13. The apparatus of claim 12 wherein the conveyance device comprises a wireline, the apparatus further comprising a depth controller configured to provide signals indicative of a depth of said tool.

14. The apparatus of claim 6 further comprising a channel number generator configured to produce a numerical sequence of memory address codes corresponding to a sequence of adjacent time windows.

15. The apparatus of claim 14 further comprising a spectrum accumulator.

16. The apparatus of claim 6 further comprising a mass storage unit associated with the processor.

17. A method for estimating a parameter of interest of an earth formation with a tool having a nuclear radiation source and a nuclear radiation detector spaced apart from the nuclear radiation source, the method comprising:
   (a) activating the nuclear radiation source;
   (b) defining a starting time for a processing time window at which measurements made by the nuclear radiation detector are responsive primarily to the parameter of interest;
   (c) determining an ending time for the processing time window by forming a running sum of count rates starting at the starting time and determining a time at which the count rate has a predetermined relation to the running sum; and
   (d) analyzing the measurements within the processing time window for estimating the parameter of interest.

18. The method of claim 17 wherein defining the starting time further comprises determining a time at which a value of the measurements has a predetermined relationship to an estimated value of a parameter of interest at an ending time of a processing time window for an earlier operation of said source.

19. The method of claim 17 wherein the nuclear radiation source comprises a pulsed neutron source.

20. The method of claim 17 wherein the parameter of interest comprises at least one of (i) a thermal neutron capture cross section of the earth formation, (ii) porosity, (iii) formation water salinity, and, (iv) the quantity and type of hydrocarbons contained in pore spaces.

21. The method of claim 17 wherein said relationship is of the form $$istr = K/\Sigma$$

where istr is the start time of a window, K is a constant, and $\Sigma$ is a capture cross section at the ending time of the processing time window for the earlier operation of the source.

22. An apparatus for use within a borehole penetrating an earth formation for estimating a parameter of interest of said earth formation, comprising:
   (a) a nuclear radiation source configured to irradiate the earth formation;
   (b) a nuclear radiation detector spaced apart from said nuclear radiation source;
   (c) a processor configured to:
      (i) define a starting time for a processing time window at which measurements made by the nuclear radiation detector are responsive primarily to the parameter of interest;
      (ii) processe the measurements to determine an ending time for the processing time window by forming a running sum of count rates starting at the starting time and determining a time at which the count rate has a predetermined relation to the running sum; and
      (iii) analyze the measurements within the processing time window to estimate the parameter of interest.

23. The apparatus of claim 22, wherein the processor defines the starting time by determining a time at which a value of the measurements has a predetermined relation to a determined value of a parameter of interest at an ending time of a processing time window for an earlier operation of the nuclear radiation source.

24. The apparatus of claim 22, wherein the nuclear radiation source further comprises a pulsed neutron source.

25. The apparatus of claim 24, wherein the parameter of interest determined by the processor further comprises at least one of (i) a thermal neutron capture cross section of the earth formation, (ii) porosity, (iii) formation water salinity, and, (iv) the quantity and type of hydrocarbons contained in pore spaces.

* * * * *